United States Patent [19]

Muellich

[11] Patent Number: 5,893,959
[45] Date of Patent: Apr. 13, 1999

[54] WORKPIECE OF PLASTIC AND PRODUCTION PROCESS FOR SUCH A WORKPIECE

[75] Inventor: Vitus Muellich, Rietheim-Weilheim, Germany

[73] Assignee: Marquardt GmbH, Rietheim-Weilheim, Germany

[21] Appl. No.: 08/702,434

[22] PCT Filed: Mar. 23, 1995

[86] PCT No.: PCT/DE95/00394

§ 371 Date: Sep. 24, 1996

§ 102(e) Date: Sep. 24, 1996

[87] PCT Pub. No.: WO95/26869

PCT Pub. Date: Oct. 12, 1995

[30] Foreign Application Priority Data

Mar. 31, 1994 [DE] Germany ............... 44 11 251

[51] Int. Cl.[6] .................................................. B29C 65/16
[52] U.S. Cl. ................. 156/272.8; 156/293; 156/304.1;
156/304.2; 156/304.6; 156/308.4; 428/522;
200/284; 200/293
[58] Field of Search ........................ 156/293, 304.1,
156/304.2, 304.6, 272.8, 308.2, 308.4; 428/522;
200/284, 293

[56] References Cited

U.S. PATENT DOCUMENTS

| | | |
|---|---|---|
| 3,477,194 | 11/1969 | Corrsin . |
| 3,769,117 | 10/1973 | Bowen et al. . |
| 3,960,624 | 6/1976 | Erlandson . |
| 4,419,304 | 12/1983 | Fick et al. . |
| 4,933,110 | 6/1990 | Tucker . |
| 5,279,693 | 1/1994 | Robinson et al. . |

FOREIGN PATENT DOCUMENTS

| | | |
|---|---|---|
| 0159169 | 10/1985 | European Pat. Off. . |
| 0288884 | 11/1988 | European Pat. Off. . |
| 0483569 | 5/1992 | European Pat. Off. . |
| 1506163 | 11/1967 | France . |
| 2725463 | 12/1977 | Germany . |
| 3621030 | 1/1988 | Germany . |
| 3813570 | 11/1989 | Germany . |
| 9015782 U | 2/1991 | Germany . |
| 1051397 | 12/1966 | United Kingdom . |
| 2271312 | 4/1994 | United Kingdom . |
| 2276584 | 10/1994 | United Kingdom . |
| 89/10832 | 11/1989 | WIPO . |

*Primary Examiner*—Michael W. Ball
*Assistant Examiner*—Sam Chuan Yao
*Attorney, Agent, or Firm*—Venable; Gabor J. Kelemen

[57] ABSTRACT

The invention relates to a workpiece, in particular a housing (6) for an electrical switch, and to a process for its production. The workpiece is composed of at least two workpiece parts (7, 8) of plastic, preferably a thermo-plastic, welded together by laser beams (11) along a joining zone (10), the two workpiece parts (7, 8) having a transmission coefficient and an absorption coefficient for the spectrum of the laser beams (11) which are different from one another, at least in subregions. The one, first workpiece part (8) is made to be at least partially transmitting for the laser beams (11) in the region from a first coupling-in zone (12), in which the laser beams (11) impinge on the first workpiece part (8), up to the joining zone (10), whereby part of the laser beams (11) can penetrate through the first workpiece part (8) and can penetrate into the second workpiece part (7) at a second coupling-in zone (13). The second workpiece part (7) is made to be at least partially absorbent for the laser beams (11) in the region of the joining zone (10) at the second coupling-in zone (13).

36 Claims, 3 Drawing Sheets

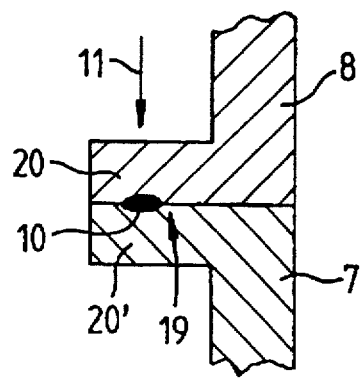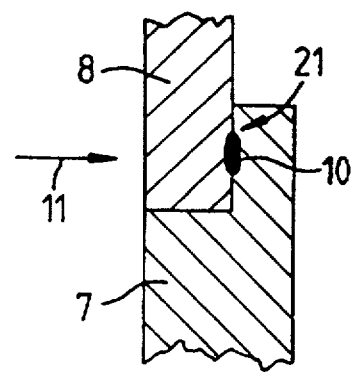
Fig. 6      Fig. 7
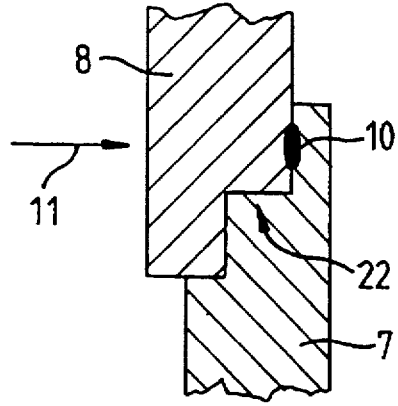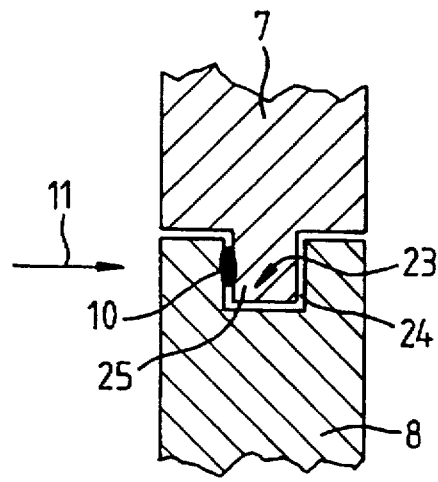
Fig. 8      Fig. 10
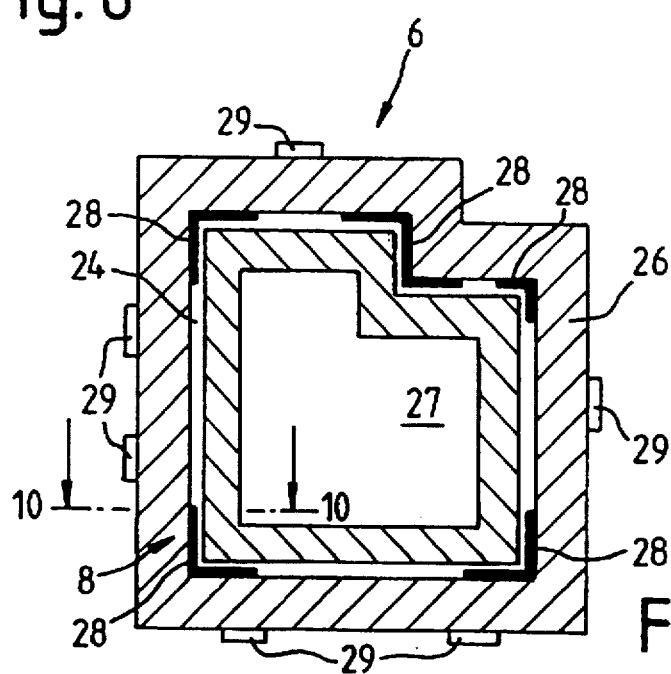
Fig. 9

WORKPIECE OF PLASTIC AND PRODUCTION PROCESS FOR SUCH A WORKPIECE

BACKGROUND OF THE INVENTION

The invention relates to an article of manufacture (also referred to as a workpiece), particularly a housing for an electrical switch. First and second plastic parts of the article of manufacture are in a face-to-face relationship and are welded together by a laser beam along a joining zone. The first and second plastic parts have, for a laser beam spectrum, transmission coefficients as well as absorption coefficients different from one another. The first plastic part has a first coupling-in zone designed as a location of impingement of the laser beam. The first plastic part is transparent for the laser beam from the first coupling-in zone to the joining zone, whereby at least one part of the laser beam can pass through the first plastic part and can penetrate into the second plastic part at a second coupling-in zone thereof. The second plastic part is absorbent for the laser beam in a region of the joining zone at the second coupling-in zone. The invention also relates to a process of welding together the first and second plastic parts by a laser beam to form the article of manufacture.

Housings consisting of plastic for electrical switches serve for accommodating the electrical components, such as fixed contacts, switching contacts, etc., and possibly further components. The housings are generally composed of a plurality of housing parts, as a rule of a complex spatial shape. The housing parts are put together during the assembly of the switch, a solid connection between the housing parts often having to be produced. This connection must be adapted to the contour of the housing parts and consequently may have a spatially three-dimensional form.

It is known, in particular if the housings are to be hermetically sealed toward the outside, to connect the housing parts to one another by means of ultrasonic welding. It is disadvantageous in this case that solder connections on the electrical components and also the electrical components themselves may be destroyed on account of the ultrasonic vibrations, ultimately making the switch unusable. There is consequently the need for a process for welding the housing parts of electrical switches which does not adversely affect the electrical components.

It is known from German Offenlegungsschrift 36 21 030 to weld plastic films to one another by the action of laser beams. For this purpose, the plastic films are laid flat one on top of the other. Subsequently, a focused laser beam passes through the films, the films being heated in the joining zone in such a way that they assume a molten state, with the result that after cooling they are bonded together in the joining zone.

Films are thin parts, with the result that heating up in the entire joining zone is possible when the laser beams pass through. As a rule, an acceptable welded connection between the films is thereby accomplished. In the case of thicker workpieces, such as in the case of housings of electrical switches, only a superficial heating up of the workpiece is possible however with the known joining process, whereby a usable welded connection between two workpiece parts is not achievable. In particular, for design reasons, in the case of housing parts of electrical switches the joining zone is often arranged on the inner side of the housing. Such an inner welded connection obviously cannot be produced by the known joining process.

A process for welding sheets of plastic by means of laser beams is further known from EP-A2-0 159 169. In the case of this process, a second sheet is arranged on a first sheet, which is made to be absorbent for the laser beam by using an additive in the plastic. Used as the additive is a black dye, in most cases carbon black. The plastic of the second sheet does not contain any additives, with the result that the second sheet is largely transparent for the laser beam.

Subsequently, a laser beam acts on the second sheet, the laser beam penetrating the second sheet and being absorbed in the first sheet, with the result that the contact surfaces of the two sheets adjacent to one another melt and bond together during the subsequent cooling.

In the case of this process it is disadvantageous that the second sheet must not contain any additive and is in an uncolored, milky-white state, while the first sheet is colored with a black dye. The workpieces produced thereby are consequently composed of parts of a very different color, with the result that the overall visual impression is adversely affected. It is, however, desired specifically in the case of housings of electrical switches that the complete housing has a homogeneous visual impression, in particular with regard to the color. Moreover, the sheets shown in the published specification constitute planar formations which are welded together over a flat surface. However, as a rule, housing parts, in particular those for electrical switches or the like, have complicated geometries, the joining zone of the parts to be connected to one another having to follow this geometry and therefore not being restricted to one plane. The published specification does not provide any suggestion for the production of complex, spatially extending joining zones. The known process is therefore not suitable for the welding of housing parts, in particular for electrical switches.

SUMMARY OF THE INVENTION

It is an object of the invention to provide a workpiece composed of a plurality of workpiece parts in such a way that the workpiece parts can be connected to one another by means of laser beams, in particular at an inner, three-dimensional spatial joining zone. It is a further object to provide a process for the production of such a workpiece.

This object and others to become apparent as the specification progresses, are accomplished by the invention, according to which, briefly stated, the transmission coefficient of the first plastic part and the absorption coefficient of the second plastic part are set by additives to the plastic material of the first and second plastic parts such that the first plastic part is at least partially transparent for the spectrum of the laser beam in a region from the the first coupling-in zone to the joining zone and the second plastic part is at least partially absorbent for the spectrum of the laser beam in a region of the second coupling-in zone. Further the reflectivity of the first and second plastic parts is substantially identical for visible light rays.

The invention is based on the idea that the laser beams penetrate through the first workpiece part, closest to the laser beam source, substantially unhindered and are largely absorbed in the second workpiece part, whereby a melting of the two workpiece parts at the joining zone is achieved. For this purpose, at least in the regions touched by the laser beams, the first workpiece part is made to be largely transmitting for the laser beams and the second workpiece part is made to be largely absorbent for the laser beams by an appropriate proportion of additives. For this purpose, the first workpiece part has a high transmission coefficient and a low absorption coefficient in comparison with the second workpiece part, i.e. the first workpiece part has a greater transmission coefficient than the second workpiece part and the second workpiece part has a greater absorption coefficient than the first workpiece part. Since, however, both workpiece parts contain additives, they are impermeable for light rays in the range visible for the human eye, thereby advantageously resulting in a substantially homogeneous visual impression. After welding, the individual workpiece parts are substantially no longer distinguishable by the human eye.

In particular, the second workpiece part can be made to be absorbent at the surface in such a way that the laser beams penetrate into the second workpiece part only a small distance. As a result, even at low laser outputs, good results are achieved during welding. The transmission coefficient, determining the degree of transmission, and absorption coefficient, determining the degree of absorption, for the two workpiece parts can be adjusted by additives in the plastic, for example dye pigments. It has been found to be favorable if the first workpiece part is adjusted to a transmission T of greater than 60% and absorption A of less than 30% and the second workpiece part is adjusted to an absorption A of greater than 90% and, in particular, a negligible transmission T.

In particular in the case of workpieces of a complex shape, the joining zone can extend three-dimensionally spatially and also in the interior of the workpiece, with the result that the workpiece parts can be adapted optimally to the respective intended use. For achieving a good sealing of the interior of the workpiece, the walls of the workpiece parts adjacent to one another can be made to overlap, it being possible that a sectoral welding may suffice in the joining zone by means of laser beams at the critical regions, such as corners, lead-throughs or the like. The workpiece parts to be connected to one another can have an overlapping joint of the most varied configuration in the joining zone.

The quality of the joining zone can be further increased by the action of pressure on the joining zone until cooling down. The action of pressure is preferably brought to bear alongside the focus of the laser beams, with the result that the penetration of the laser beams into the workpiece is not hindered. It is also conceivable, however, to use clamping means which are transparent for the laser beam, with the result that the action of pressure can also be brought to bear directly in the region of action of the laser beams. In a preferred way, the action of pressure is made to track the movement of the laser beams along the joining zone. This movement of the laser beams can be carried out in a simple way, even in a spatially programmable manner, for example in that a robot or multi-axis handling device is used. In particular sectoral weldings at individual locations of the workpiece can consequently be produced in a simple way. A further optimization of the production process can be achieved by the operating parameters of the laser beam source being automatically controlled in a way corresponding to the measured process parameters prevailing in the joining zone, such as pressure and temperature.

The advantages achieved by the invention are, in particular, that a high-quality weld can be achieved when welding by means of laser beams and said weld may be of an overlapping or abutting configuration and, in particular, may run at least partially in the interior of the workpiece, even in the case of workpieces of large wall thicknesses. Unlike in the case of the previously customary ultrasonic welding, the configuration of the weld can be freely adapted to the design requirements, i.e. it can be spatially arranged as desired in the housing. The path taken by the weld can be produced by a programmable beam guidance of the laser beams or movement of the workpiece, with the result that a flexible fabrication of a wide variety of different workpieces is possible. The welding of the workpiece parts is performed just by heating them up; in any event further additives are not necessary for the actual welding. In particular in the production of electrical switches, waste is avoided, since destruction of the electrical components need not be feared.

BRIEF DESCRIPTION OF THE DRAWINGS

Exemplary embodiments of the invention are described in more detail below and are represented in the drawings, in which:

FIG. 6 shows a longitudinal section through the wall of a housing in another embodiment, FIG. 7 shows a longitudinal section through the wall of a housing in yet another embodiment, FIG. 8 shows a longitudinal section through the wall of a housing in a further embodiment, FIG. 9 shows a cross section through a housing of complex spatial design and FIG. 10 shows a section along the line 10—10 from FIG. 9.

DESCRIPTION OF THE PREFERRED EMBODIMENTS

Figure 1:
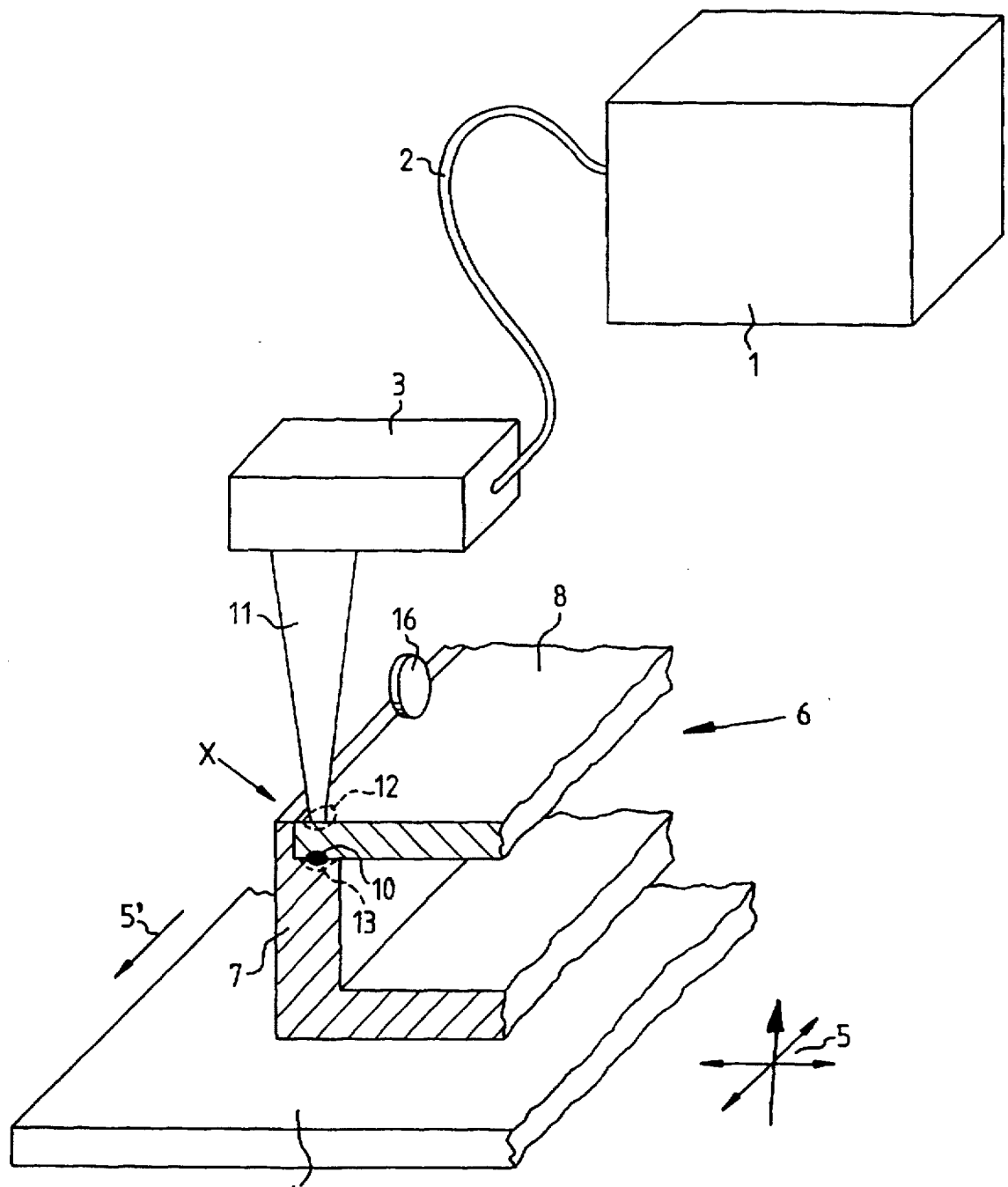
FIG. 1 diagrammatically shows an apparatus for welding a housing for an electrical switch.

An apparatus for welding workpiece parts by means of a laser beam in a way corresponding to the process according to the invention is diagrammatically represented in FIG. 1. This apparatus comprises a laser beam source 1, for example an ND:YAG laser, the light exit opening of which is connected via a flexible light guide 2 to an optical system 3, with the result that the laser beam source 1 can be spatially positioned as desired. The optical system 3 is arranged over a workpiece holder 4, which can be moved by a controller by means of drives, f or example as indicated in FIG. 1 by means of the directional arrows 5. It goes without saying that the optical system 3 may also be of a movable design.

On the workpiece holder 4 there are expediently arranged the workpiece parts to be welded together, namely the parts for a housing 6, the housing 6 being in the present case the housing for an electrical switch. The housing 6 is composed of two housing parts, such as a pot-shaped housing base 7, which forms the second workpiece part, and a housing cover 8, which represents the first workpiece part. Both the housing base 7 and the housing cover 8 consist of plastic, preferably a thermoplastic. As emerges in more detail from FIG. 2, the housing base 7 has an annularly surrounding shoulder 9, on which the housing cover 8 is placed. At the shoulder 9, the housing cover 8 is welded to the housing base 7 by means of laser beams along a continuously annularly surrounding joining zone 10, with the result that the interior of the housing 6 of the electrical switch is hermetically sealed, thus is protected in particular against the penetration of dust.

As further emerges from FIG. 1, the housing cover 8 and the housing base 7 are heated up by means of laser beam 11, which is radiated from the optical system 3 onto the housing 6, along the joining zone 10 in such a way that the housing base 7 and the housing cover 8 go into a molten state in the joining zone 10. This produces a bonding of housing base 7 and housing cover 8 in the joining zone 10, which solidifies during the subsequent cooling and forms a weld. Thereafter, if necessary, a thermal annealing may follow, to relieve welding stresses in the joining zone 10. By corresponding movement of the workpiece holder 4 and/or the optical system 3 or the laser beam source 1, an annularly surrounding elongate joining zone 10 is obtained on the housing 6. If it is adequate, the housing 6 may also be welded just at individual locations, with the result that not a continuous but a sectional, sectoral joining zone is obtained. Advantageously, in the case of sectoral welding lower welding stresses are introduced, possibly dispensing with the need for subsequent annealing.

It is immediately evident that, by corresponding movement of the laser beam source 1 or the optical system 3 and the workpiece parts 7, 8 in relation to one another, a freely orientable, three-dimensionally spatially arranged joining zone 10 can also be produced in the housing 6. For this purpose, for example, the workpiece holder 4 is designed as a multi-axis handling device which is movable in three dimensions according to the arrows 5. A robot can equally well be used f or this, or the optical system 3 can be correspondingly moved. The desired spatial movement of the workpiece holder 4 is programmable, with the result that during the welding the respectively corresponding spatially configured joining zone 10 is produced. Advantageously, complexly configured joining zones 10, as occur in particular in the case of housings 6 for electrical switches, can be produced thereby in a way which is simple to handle and flexible.

Figure 2:
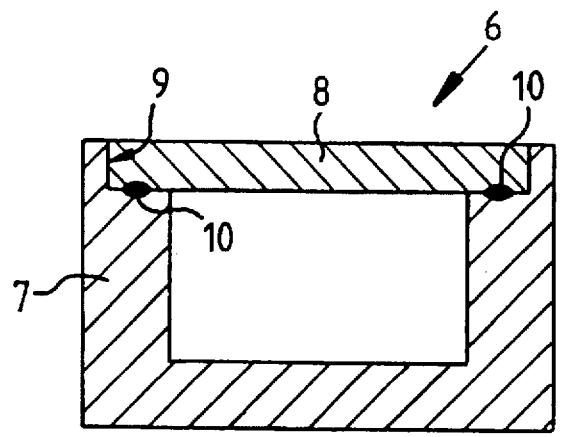
FIG. 2 shows a longitudinal section through a housing.
Figure 4:
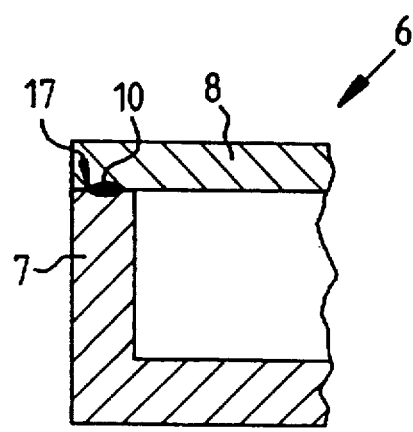
FIG. 4 shows a longitudinal section through part of a housing in a further embodiment.
Figure 5:
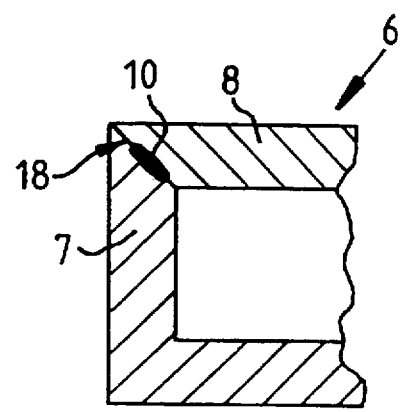
FIG. 5 shows a longitudinal section through part of a housing in yet a further embodiment.

As can be seen in particular in FIG. 2, for design reasons, the joining zone 10 lies in the interior of the housing 6, the joining zone 10 having an overlapping joint on account of the shoulder 9. In a way corresponding to a further embodiment, which can be seen in FIG. 4, the housing cover 8 and the housing base 7 are formed with an abuttingly overlapping joint 17. In yet a further embodiment according to FIG. 5, the housing base 7 and the housing cover 8 have a wedge-like overlapping joint 18. Also in the case of these further embodiments, the joining zone 10 is located at least partially in the interior of the housing 6.

In the a further embodiment illustrated in FIG. 6, a further shoulder-like overlapping joint 19 is shown. The workpiece parts 7, 8 have in each case a shoulder 20, 20' jutting out from the actual wall, the joining zone 10 being arranged at the transition between the projecting shoulders 20, 20'. The laser beam 11 in this case acts approximately perpendicularly on the shoulder 20 on the side opposite the shoulder 20'. Yet further designs for shoulder-shaped joints can be seen in FIGS. 7 and 8. In the case of the shoulder-like joint 21 in FIG. 7, the workpiece part 7 is provided with a step-shaped receptacle, in which the wall of the workpiece part 8 is inserted. In FIG. 8 the workpiece part 7 is provided with a stair-like receptacle, in which the respectively corresponding wall of the workpiece part 8 is inserted in a way corresponding to a shoulder-like joint 22.

In FIG. 10, a groove-like overlapping joint 23 is shown, with which in particular a good sealing effect is achieved in the manner of a labyrinth seal against the penetration of dust into the interior of the housing 6. For this purpose, in the wall of the workpiece part 8 there is formed a groove 24, in which a respectively corresponding tongue 25 on the wall of the workpiece part 7 engages. The laser beam 11 impinges approximately perpendicularly onto the surface of the workpiece part 8 in the region of the groove 24, whereby a joining zone 10 is produced between the tongue 25 and the groove 24 on the side facing this surface of the workpiece part 8.

Shown in FIG. 9 is a section through a somewhat more complex workpiece part 6, in which the walls 26 have a three-dimensional contour, which is adapted to the respective intended use. Such a complex housing 6 is used, for example, in the case of an electrical switch for electric hand tools and has an inner cavity 27, which is bounded by the walls 26 of the workpiece part 8 and serves for accommodating the functional parts of the electrical switch. For achieving good dustproofness for the cavity 27, in the wall 26 there is a groove 24, at which a tongue 25 of the further workpiece part 7 engages, as already explained with reference to FIG. 10.

As can further be seen in FIG. 9, in the groove 24 there are sectoral joining zones 28, with the result that the two workpiece parts 7, 8 are welded together there at the connecting surfaces lying against one another. The sectoral joining zones 28 have a hook-shaped or zigzag-shaped path, which is produced by a correspondingly programmable, three-dimensionally spatial relative movement between the laser beam 11 and the workpiece parts 7, 8. The joining zones 28 are not provided continuously throughout, but just in individual sectors. These are, in particular, the region of the corners of the walls 26 or of turning points at which the weld has an abrupt change in direction. Furthermore, sectoral joining zones may also be arranged in regions at which there are lead-throughs or the like, not shown any further, for example for shafts, pushrods etc., from the outer side into the cavity 27 of the housing 6. Such regions are particularly critical for the seal-tightness and are reliably sealed by the sectoral joining zones 28.

Between the sectors of the joining zones 28 there extend only straight surfaces, which may be sealed in a less sophisticated manner. Non-welded overlapping between the grooves 24 and the tongue 25 on the walls 26 of the workpiece parts 7, 8 suffices here, these acting as sealing grooves. Supporting this, between the sectors of the joining zones 28 there may also be provided snap connections 29 or the like, with the aid of which the connecting surfaces on the walls 26 of the two workpiece parts 7, 8 are pressed onto one another in a sealing manner in these regions. Since in such a case only sectoral joining zones 28 are arranged, a time saving when welding the workpiece parts 7, 8 is advantageously obtained.

To achieve a sufficient heating up of the joining zone 10, the housing base 7 and the housing cover 8 have, at least in subregions, different properties for the spectrum of the laser beam 11. For instance, the transmission coefficient for the laser beam 11 is greater in the case of the housing cover 8 than that in the case of the housing base 7, while conversely the absorption coefficient in the case of the housing base 7 is greater than in the case of the housing cover 8. The two workpiece parts, composed of housing base 7 and housing cover 8, and the optical system 3 of the laser beam source 1 are then positioned in relation to one another in such a way that the laser beam 11 impinges on the housing cover 8 on the side facing away from the joining zone 10 in a first coupling-in zone 12, as can be gathered from FIG. 3. The first workpiece part, namely the housing cover 8, is made to be at least partially transmitting for the spectrum of the laser beam 11, on account of its large transmission coefficient, in the region from the first coupling-in zone 12 up to the joining zone 10. As a result, at least part of the laser beam 11 can penetrate through the housing cover 8. At a second coupling-in zone 13, which is diagrammatically indicated in FIG. 3, this part of the laser beam 11 then penetrates into the second workpiece part, namely the housing base 7. As can be seen, the first coupling-in zone 12 and second coupling-in zone 13 lie substantially on the straight line formed by the laser beam 11. In particular, this straight line is approximately perpendicular to the coupling-in zones 12, 13.

Figure 3:
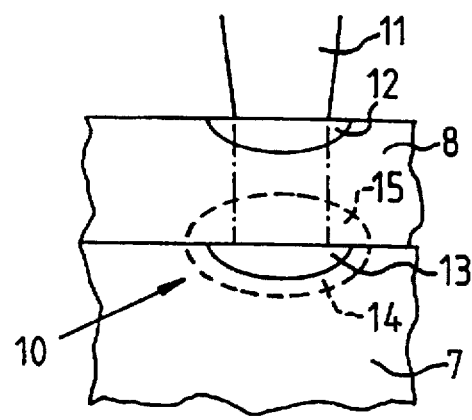
FIG. 3 shows an enlarged cutout according to detail X from FIG. 1.

The housing base 7 is made to be at least partially absorbent for the spectrum of the laser beam 11, on account of its large absorption coefficient, in the region of the joining zone 10 at the second coupling-in zone 13, with the result that at least part of the laser beam 11 impinging at the second coupling-in zone 13 heats up the housing base 7 in an absorption zone 14. It may suffice in this case if the housing base 7 is made to be absorbent at the surface of the second coupling-in zone 13, or the wavelength of the laser beam 11 used is correspondingly chosen, in such a way that the laser beam 11 penetrates only a small distance, preferably of just a few μm, into the housing base 7, whereby the absorption zone 14 is likewise formed only superficially in the housing base 7, as is indicated in FIG. 3. On account of thermal conduction out of the absorption zone 14 into the adjacent housing cover 8, the latter is likewise heated up in a thermal conduction zone 15. The heating up in the absorption zone 14 and the thermal conduction zone 15 has the effect that the plastic becomes molten, the common solidified joining zone 10 thereby being formed in these two zones 14, 15 after cooling down.

As already mentioned, the housing 6 consists of a plastic. The use of styrene-acrylonitrile copolymer, polyamide or the like has proved to be particularly suitable here for the housing of an electrical switch. For adjusting the partial transparency of the housing cover 8 and the partial absorption of the housing base 7 for the spectrum of the laser beam 11, that is to say the transmission coefficient and absorption coefficient, additives such as dye pigments, glass fibers or the like are used in the plastic. In this case, the corresponding adjustment is performed by a different proportion of the additives in the two workpiece parts 7, 8, the proportions being chosen such that the reflectivity of the two workpiece parts 7, 8 for the spectrum of visible light rays is substantially the same. In particular, it has been found to be favorable to achieve the high absorption coefficient for the housing base 7 by black dye pigments. Corresponding tests have shown in the case of the types of plastic mentioned that it is favorable to carry out for the partially absorbent plastic of the housing base 7 a pigmentation by 1% to 2% of dyes and for the plastic of the partial transmitting housing cover 8 a lower pigmentation, in special cases even no pigmentation. The two workpiece parts 7, 8 are then substantially opaque for the light spectrum visible with the human eye and are colored black with an approximately uniform visual effect. The two workpiece parts 7, 8 in the housing 6 then advantageously offer a visually homogeneous impression, with the result that the different adjustment of the respective plastic is not perceptible for the eye.

Tests by means of an ND:YAG laser of 10 W output, which generates laser beams at a wavelength of about 1.06 μm, which is particularly suitable for the said types of plastic, and an advancement rate of the housing 6 in relation to the optical system 3 of 3 m/min have shown that good results are achieved for the welding if the following parameters are maintained. The housing cover 8 should have a transmission T of greater than 60% and an absorption A of less than 30% and also, if applicable, a reflectivity R of less than 20% for the spectrum of ND:YAG laser beams. The housing base 7 should further have an absorption A of greater than 90% and, in particular, a negligible transmission T and, if applicable, a reflectivity R of less than 10%. The percentage figures are in this case respectively related to the laser beams 11 impinging in the coupling-in zone 12, 13. In the respective individual case, $$T+A+R=100\%.$$

It must also be stressed that the proportion of the laser beam 11 reflected at the respective coupling-in zones 12, 13 contributes little to the heating up in the joining zone 10 and therefore should be kept as small as possible by corresponding adjustment of the plastic.

To improve the quality of the welding, the action of a pressure can be brought to bear in the region of the joining zone 10 during or after the heating up and melting of the joining zone 10 by the laser beam 11. Shown for this purpose in FIG. 1 is a pressure roller 16, which acts on the upper side of the housing cover 8 in the region of the joining zone 10. This pressure roller 16 is made to track the laser beam 11 in a way corresponding to the advancing movement of the workpiece holder 4 according to the directional arrow 5'. Consequently, the pressure of the pressure roller 16 acts until cooling down of the joining zone 10, thereby preventing escape of the melt from the joining zone 10 and averting the risk of voids forming in the joining zone 10. It can be seen from FIG. 1 that this action of pressure is brought to bear alongside the focus of the laser beam 11, with the result that the laser beam 11 is undisturbed in the coupling-in zone 12 on the housing cover 8. It goes without saying that, instead of a pressure roller 16, hydraulic, pneumatic or similar hold-down devices known per se but not shown any further can also be used, it being possible on account of the freely orientable beam guidance for these to be arranged outside the guidance of the laser beam 11. If these hold-down devices consist of a material which is largely transparent for the spectrum of the laser beam 11, these hold-down devices may also be located in the guidance of the laser beam.

The quality of the welding can be further influenced positively in that the operating parameters of the laser beam source 1 are automatically controlled continuously as a function of the process parameters prevailing in the joining zone 10. These process parameters are the temperature, the pressure and the like. They are continuously measured and, when there are deviations from the setpoint values, the operating parameters of the laser beam source 1 are changed correspondingly until the desired setpoint values are again reached.

The invention is not restricted to the exemplary embodiments described and represented. Rather, it also comprises all developments by a person skilled in the art within the scope of the inventive idea. For instance, the invention can be used not only in the production of electrical switches but also on any desired workpieces, housings or the like consisting of plastic, for example for household appliances, packaging etc.

I claim:

1. In an article of manufacture, including
   first and second plastic parts being in a face-to-face relationship and being welded together by a laser beam along a joining zone; said first and second plastic parts having, for a laser beam spectrum, transmission coefficients different from one another and absorption coefficients different from one another; said first plastic part having a first coupling-in zone designed as a location of impingement of the laser beam; said first plastic part being transparent for the laser beam from said first coupling-in zone to said joining zone, whereby at least one part of the laser beam can pass through said first plastic part and can penetrate into said second plastic part at a second coupling-in zone thereof; said second plastic part being absorbent for the laser beam in a region of said joining zone at said second coupling-in zone;

the improvement wherein said transmission coefficient of said first plastic part and said absorption coefficient of said second plastic part are set by additives to the plastic material of said first and second plastic parts such that said first plastic part is at least partially transparent for the spectrum of the laser beam in a region from said first coupling-in zone to said joining zone and said second plastic part is at least partially absorbent for the spectrum of the laser beam in a region of said second coupling-in zone; and further wherein a reflectivity of said first and second plastic parts is substantially identical for visible light rays throughout the first and second plastic parts, and said first and second plastic parts are substantially opaque to visible light.

2. The article of manufacture as defined in claim 1, wherein said article of manufacture is an electric switch housing.

3. The article of manufacture as defined in claim 1, wherein the plastic material of said first and second plastic parts is a thermoplastic.

4. The article of manufacture as defined in claim 1, wherein said additives to the plastic material of said first and second plastic parts include glass fibers.

5. The article of manufacture as defined in claim 1, wherein said additives to the plastic material of said first and second plastic parts include dye pigments.

6. The article of manufacture as defined in claim 1, wherein said additives to the plastic material of said first and second plastic parts include black dye pigments.

7. The article of manufacture as defined in claim 1, wherein said second plastic part is absorbent at a surface of said second coupling-in zone to such an extent that the laser beam penetrates into said second plastic part to a distance of a few μm, whereby an absorption zone for the laser beam in said second plastic part is essentially along a surface thereof, at said second coupling-in zone.

8. The article of manufacture as defined in claim 1, wherein said first and second plastic parts are made of the same plastic material.

9. The article of manufacture as defined in claim 8, wherein said same plastic material is selected from the group consisting of styrene-acrylonitrile copolymer and polyamide.

10. The article of manufacture as defined in claim 1, wherein said article of manufacture is an electric switch housing and further wherein, related to the laser beam impinging on the first and second coupling-in zones, said first plastic part has a transmission coefficient of greater than 60% and an absorption coefficient of less than 30%, and said second plastic part has an absorption coefficient of more than 90% and a negligible transmission coefficient.

11. The article of manufacture as defined in claim 10, wherein said first plastic part has a reflectivity of less than 20%.

12. The article of manufacture as defined in claim 10, wherein said second plastic part has a reflectivity of less than 10%.

13. The article of manufacture as defined in claim 1, wherein at said joining zone said first and second plastic parts have one of a wedge-shaped overlapping joint, a groove-shaped overlapping joint, a shoulder-shaped overlapping joint and an abuttingly overlapping joint.

14. The article of manufacture as defined in claim 13, wherein said joining zone extends three-dimensionally along and between said first and second plastic parts.

15. The article of manufacture as defined in claim 13, wherein at least one part of said joining zone is situated in an interior of said article of manufacture.

16. The article of manufacture as defined in claim 1, further comprising a cavity and wherein said first and second plastic parts have walls bordering said cavity; wherein said joining zone is formed of a series of individual, spaced joining zone portions.

17. The article of manufacture as defined in claim 16, wherein said series extends around corner zones of said walls.

18. The article of manufacture as defined in claim 16, wherein said series extends in lead-throughs leading into said cavity.

19. The article of manufacture as defined in claim 16, wherein said series extends continuously along facing surfaces of said walls.

20. The article of manufacture as defined in claim 16, further comprising snap connections provided on the walls between said joining zone portions for sealing said cavity.

21. The article of manufacture as defined in claim 16, further comprising sealing grooves and tongues provided in the walls between said joining zone portions for sealing said cavity.

22. A process for welding together a first and a second plastic part by a laser beam to form an article of manufacture, wherein at least a portion of said first plastic part is transparent to the laser beam and at least a portion of said second plastic part absorbs the laser beam; said process comprising the following steps:

(a) including an additive, affecting a transparency to the laser beam, in the material of said first plastic part in a first proportion such that a region of said first plastic part is at least partially transparent to the laser beam;

(b) including an additive, affecting a transparency to the laser beam, in the material of said second plastic part in a second proportion such that a region of said second plastic part is at least partially absorbent to the laser beam; said first proportion being different from said second proportion;

(c) setting reflectivities for said first and second plastic parts such that said reflectivities are substantially identical to visible light rays throughout the first and second plastic parts, and said first and second plastic parts are substantially opaque to visible light;

(d) positioning said first and said second plastic parts in a path of a laser beam such that a surface portion of said first plastic part faces a surface portion of said second plastic part to form a joining zone and that said first plastic part is upstream of said second plastic part as viewed in a direction of propagation of the laser beam;

(e) directing the laser beam to impinge on a first coupling-in zone of said first plastic part, to pass through said region of said first plastic part from said first coupling-in zone to said joining zone, to impinge on a second coupling-in zone of said second plastic part at said joining zone and to pass into said region of said second plastic part from said second coupling-in zone, whereby said second plastic part is heated at said second coupling-in zone, causing said first and said second plastic parts to assume a molten state in said joining zone; and (f) cooling said joining zone to effect a solidifying thereof.

23. The process as defined in claim 22, wherein said additives are dye pigments.

24. The process as defined in claim 22, to so position the laser beam and the assembly formed of said first and second plastic parts that the first and second coupling-in zones lie on a straight line defined by the laser beam; further comprising the step of moving one of a laser beam source and an optical system through which the laser beam passes, and said first and second plastic parts relative to one another such that a longitudinal, three-dimensional spatial fused joining zone is obtained.

25. The process as defined in claim 24, wherein step (d) comprises the step of positioning said first and second coupling-in zones perpendicularly to said straight line.

26. The process as defined in claim 24, wherein said step of moving comprises the step of programmed moving.

27. The process as defined in claim 26, wherein the step of programmed moving comprises the step of moving by a robot.

28. The process as defined in claim 26, wherein the step of programmed moving comprises the step of moving by a multi-axis manipulating device.

29. The process as defined in claim 22, further comprising the step of exerting a pressure to a region of said joining zone.

30. The process as defined in claim 29, wherein the pressure exerting step is performed during heating and melting by the laser beam.

31. The process as defined in claim 29, wherein the pressure exerting step is performed after heating and melting by the laser beam.

32. The process as defined in claim 29, wherein the pressure exerting step is performed up to the completion of the cooling step.

33. The process as defined in claim 29, wherein the pressure exerting step is performed in a vicinity of a location where the laser beam is focused.

34. The process as defined in claim 22, further comprising the step of regulating operational parameters of a laser beam source emitting the laser beam as a function of a process parameter prevailing in said joining zone.

35. The process as defined in claim 34, wherein said process parameter is at least one of pressure and temperature.

36. The process as defined in claim 22, further comprising the step of thermally annealing the article of manufacture subsequent to the heating and melting step, for removing welding stresses.

* * * * *